June 15, 1965 R. L. JENKINS ETAL 3,189,830
AUTOMATIC FREQUENCY CONTROL WITH COMPENSATION
FOR VARIABLE SUPPLY VOLTAGE
Filed May 8, 1961
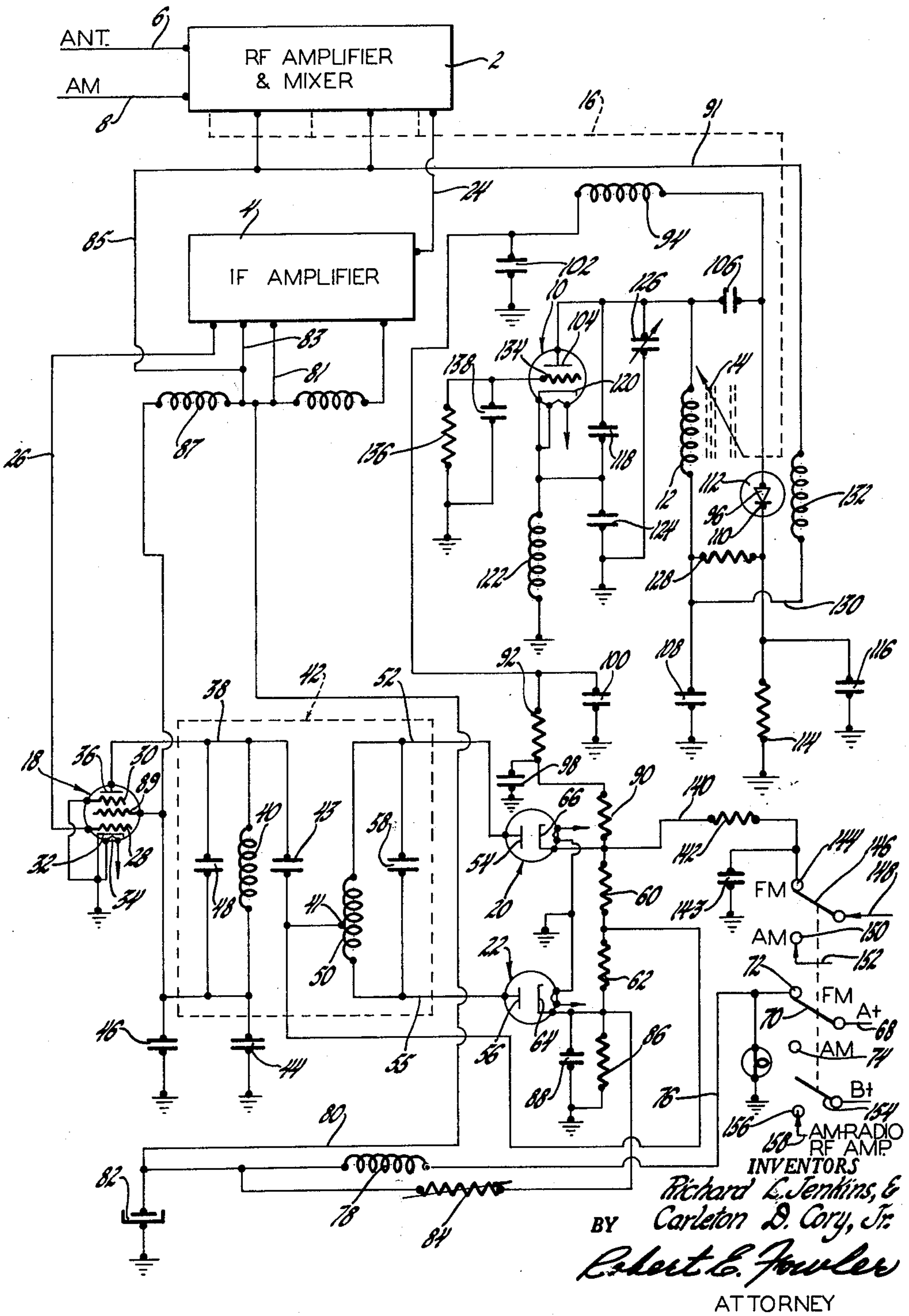
INVENTORS
Richard L. Jenkins, &
Carleton D. Cory, Jr.
BY
Robert E. Fowler
ATTORNEY 3,189,830

AUTOMATIC FREQUENCY CONTROL WITH COMPENSATION FOR VARIABLE SUPPLY VOLTAGE

Richard L. Jenkins and Carleton D. Cory, Jr., Kokomo, Ind., assignors to General Motors Corporation, Detroit, Mich., a corporation of Delaware Filed May 8, 1961, Ser. No. 108,651
3 Claims. (Cl. 325—492)

This invention relates to a conversion unit or high frequency amplifying and detecting section of a frequency modulated radio receiver which may be applied to an amplitude modulated receiver so that it may receive either FM or AM transmission. More particularly it relates to an automatic frequency control circuit for the same which is operable from a source of variable supply voltage.

The majority of automobile radio receivers that are currently manufactured and sold for domestic use in automotive vehicles are of the amplitude modulated (AM) superheterodyne type. There are, however, particularly in the urban areas of the country many frequency modulated (FM) transmitters which broadcast excellent musical programs that the car drivers and owners would enjoy receiving as the car was being operated in that vicinity.

It is, therefore, an object in making this invention to provide a converter unit which may be snapped on or plugged into a conventional AM radio receiver to permit the reception of FM signals.

It is a further object in making this invention to provide an FM converter unit for an AM radio receiver which will operate satisfactorily from a widely variable voltage source.

It is a still further object in making this invention to provide an FM high frequency amplifier and detector section with an automatic frequency control so that the same may operate properly over the wide fluctuation inherent in an automotive voltage supply.

With these and other objects in view which will become apparent as the specification proceeds, our invention will be best understood by reference to the following specification and claims and the illustrations in the accompanying drawing, in which:

The figure is a circuit diagram of a conversion unit for converting a conventional AM receiver so that it may receive FM signals which unit embodies our invention.

As mentioned above, the purpose of the present device is as a conversion unit to snap to or plug into a conventional AM radio receiver and modify the same so that it can receive and translate FM signals into audible sounds. It is a well known fact that the supply voltage available in an automotive vehicle for any purpose fluctuates widely due to the change in speed of the vehicle and, therefore, to the speed of the power generating means. Such wide fluctuations would tend to change the local oscillator frequency which would result in the signal appearing off center frequency at the discriminator of the IF amplifier and cause distortion of the audio signal. Regulating means, therefore, must be introduced to regulate the effective AFC voltage applied to the AFC diode so that the frequency will be maintained in the proper ratio to the incoming signals to avoid drift.

Referring now more particularly to the drawing per se, the first block 2 illustrates the high frequency end of the frequency modulated converter and includes the RF amplifier section and mixer section. This amplifying portion of the receiver then feeds into a second portion shown by block 4 which is the IF amplifying portion and may consist of several stages. The incoming line 6 is adapted to be connected to the antenna of the automotive vehicle which may be of the ordinary whip type and is, therefore, labeled "Ant." This applies the signal to the RF amplifier of the FM converter and through a suitable bypass circuit also to line 8 labeled AM which line is adapted to be connected back to the normal antenna connection for the conventional AM receiver. Thus the automobile antenna would feed incoming signals for either FM or AM reception without any change in connections. The local oscillator section includes the tube 10 and the associated tunable circuit which includes a variable inductance coil 12 and its associated core 14 which is movable to change the inductance value. The tuning of the oscillator together with the tuning of the various stages in the RF amplifier and mixer is indicated by the dash line connection 16 between the oscillator and the block 2.

After the incoming signals have passed through the IF amplifying stages included in block 4 they are applied to the last IF amplifier and limiter stage including tube 18 and lastly to the detector section which is a conventional discriminator utilizing tubes 20 and 22. The output of the first section 2 including the RF amplifier and mixer is fed into the IF stages through connecting line 24. The output of the plurality of stages of IF amplification and limiters is fed through line 26 to control grid 28 of the last IF amplifier stage tube 18. The suppressor grid 30 of tube 18 is connected to ground as is the cathode 32 and one side of the cathode heater filament 34, the other side of the filament being connected to a suitable source of voltage supply as indicated by the arrow. The plate 36 of the tube 18 is connected through line 38 with one terminal of primary 40 of the last IF transformer 42, the opposite side of said primary winding being connected to ground through filter condenser 44 which is shunted by a second similar filter condenser 46. The primary circuit is tuned to the intermediate frequency by condenser 48 connected in shunt to said primary winding. The secondary winding 50 of the transformer 42 has one terminal connected through conductor 52 with the anode 54 of diode 20 and the opposite terminal of the secondary 50 is likewise connected through line 55 with the anode 56 of diode 22. One terminal of primary 40 is capacitively coupled to a tap 41 on the secondary by condenser 43. The secondary winding of the IF transformer 42 is tuned to the intermediate frequency by condenser 58 connected in shunt across the secondary winding 50. The output of the discriminator is developed across the two resistances 60 and 62 which are in series between cathode 64 of tube 22 and cathode 66 of tube 20.

The A power supply for the converter is obtained from the conventional set through line 68 which is connected to movable contact 70 of a multi-contact switch. Movable contact 70 oscillates between two fixed switch contacts 72 and 74 and when in its upper position as shown provides A battery power to the converter section. Contact 72 is connected to conductive line 76 which extends to one terminal of a choke 78, the opposite terminal being connected to conductive line 80. A bypass condenser 82 is connected between line 80 and ground. Line 80 is the power supply line for the various screen grids and plates and is connected through tie lines 81, 83 and 85 to the various screen grids and plates in the high frequency end of the receiver and also through an RF choke 87 to the screen grid 89 and plate 36 of the last IF amplifier and limiter stage. This provides the proper voltage on said screens and plates. A varistor 84 has one terminal connected to line 80 and its opposite terminal connected to cathode 64 of diode 22. Cathode 64 is also bypassed to ground through resistor 86 in shunt with condenser 88. A positive bias is obtained between the cathode 64 and ground which will change as a function of the A voltage supplied at a rate greater than if element 84 were a resistor. As the voltage impressed across the divider circuit just described increases and, therefore, the current through varistor 84 increases as its internal resistance decreases. By choosing a proper value of varistor 84 and resistor 86 a desired rate of change of bias voltage on the cathode 22 with change in A voltage on contact 72 can be obtained. This acts as a reference voltage for the oscillator as will be explained.

As before mentioned, the two resistors 60 and 62 act as the discriminator output load and the upper terminal of load resistor 60 as well as being connected to cathode 66 of tube 20 is connected through filter resistance 90 in series with a second filter resistance 92 to one end of a choke coil 94 and thence to diode anode 96. Completing the filter circuits along this series path is a condenser 98 connected from a point between resistances 90 and 92 to ground and another condenser 100 connected from the other terminal of resistance 92 to ground. A further filter condenser 102 is connected between one terminal of the choke 94 to ground. The plate 104 of the oscillator tube 10 is connected through a coupling condenser 106 to the anode 96 and also to one terminal of the variable tuning inductance 12. A condenser 108 is connected to the opposite end of the variable tuning inductance 12 and to ground. The cathode 110 of the silicon diode 112 is connected through a limiting resistance 114 to ground. A condenser 116 is connected in shunt to the resistance 114. Completing the oscillator circuit a first condenser 118 is connected across the plate and cathode of the tube 10, said cathode 120 being connected to ground through an inductance 122. A further condenser 124 is connected in shunt to the inductance 122 in the cathode circuit. A variable trimmer condenser 126 is connected between plate 104 and ground. A resistance 128 is connected between the cathode 110 of the silicon diode and a point intermediate the inductance 12 and the condenser 108 in the oscillator circuit and forms part of a voltage divider to provide a desired bias on the cathode 110. To this point is also connected the "A" voltage line 130 which supplies the oscillator tube 10 through a choke 132. The control grid 134 of the oscillator tube 10 is connected to ground through a bias resistor 136 in shunt with a bypass condenser 138. The coupling of the oscillator to the mixer is supplied by the interelectrode capacity of the common oscillator-mixer tube 10.

The output signal of the FM converter is connected through line 140 and series resistor 142 with shunt capacitor 143 for de-emphasis to stationary contact 144 of the multi-contact switch. A movable arm 146 of the switch is adapted to engage this contact and is connected to line 158 which extends to the audio amplifier of the conventional receiver. Movable arm 146 of the multi-contact switch is also adapted to engage stationary contact 150 which is connected to line 152 which extends to the output of the AM detector in the conventional AM receiver. The last movable contact 154 of the multi-contact switch is adapted to engage a stationary contact 156 which is connected to line 158 extending to the radio frequency or high frequency amplifying portion of the conventional AM radio when in its lower position. Thus when the three switch arm 146, 70 and 154 are in the position shown the device is in condition for the receipt, amplification and production of signals from the FM stations. When it is in the lower position it is in the position for the reception of conventional AM signals and the converter section is de-energized. This switch may be operated either manually or automatically by the insertion of the converter unit into the conventional AM receiver.

In order to compensate for the variation in A voltage due to variation of engine speed, means have been provided to maintain the difference frequencies of the FM receiver unit constant. It has previously been explained that a voltage is developed at the cathode 64 of the discriminator which has a desired rate of change with variations in the A voltage. This particular bias voltage which is one side of the FM output is applied to the anode 96 of the diode 112 through resistors 62, 60 and through two de-coupling filter sections 90, 92 and a choke filter section 94. The cathode 110 of the diode 112, however, is connected to a voltage divider consisting of resistances 128 and 114 connected in series between the A line connection 85 which extends to the line 91 and thence through line 130 through said voltage divider 128–114 to ground. This voltage at the cathode 110 between resistances 128 and 114 will vary approximately 6.2 to 9.5 volts as the battery-generator voltage in the main system varies from 10.5 to 16 volts. It is desired to maintain a constant nominal reverse bias voltage on the diode. If it is assumed that such bias be of the order of 3 volts then the bias on the varistor-resistor divider consisting of varistor 84 and resistance 86 should vary from 3.2 to 6.5 volts. This can be accomplished by selecting the proper values for the varistor and resistor involved. If the proper values are assigned, as the A voltage swings through its range there will always be maintained across the diode a reverse bias of 3 volts regardless of the value of supply voltage. The discriminator output voltage is then added algebraically to the difference voltage to change the diode capacity but since the difference voltage always remains the same no error is introduced frequency-wise into the system by the change in A voltage value. The diode 112 and condenser 106 are effectively in series across the oscillator tank circuit and apply the proper AFC to the circuit.

What is claimed is:

1. In a radio receiver circuit, a source of frequency modulated waves, high frequency amplifying and mixing means for amplifying said frequency modulated waves connected to said source, local oscillator means connected to said high frequency amplifying and mixing means to create a resultant beat frequency of lower value, said local oscillator means having a tunable tank circuit to determine its frequency of oscillation, a source of electrical power whose voltage varies, a plurality of voltage divider means each having an intermediate reference point, said voltage divider means being connected to the source of electrical power and to ground and providing desired voltages at said intermediate reference points, a diode connected across the intermediate points of the voltage divider means so that the reference voltage across said diode remains the same regardless of the variation in the voltage of the source of electrical power, said diode being connected across the tunable tank circuit to regulate the capacity thereof and therefore control the frequency of the output.

2. In a radio receiver circuit, a source of frequency modulated waves, high frequency amplifying and mixing means for amplifying said frequency modulated waves connected to said source, local oscillator means connected to said high frequency amplifying and mixing means to create a resultant beat frequency of lower value, said local oscillator means having a tunable tank circuit to determine its frequency of oscillation, a discriminator-detector section connected to said high frequency amplifying and mixing means to convert the frequency modulations into voltage variations, a reference diode, a source of electrical power of variable voltage, a first and a second voltage divider means connected to the source of electrical power and to ground and having intermediate reference points in each at which desired voltages are developed, said intermediate reference point in said first voltage divider means being connected to the output of the discriminator-detector section and said reference diode being connected across said reference points of the first and second voltage divider means and to the tunable tank circuit of the oscillator to regulate the voltage across the diode and maintain the frequency of the oscillator constant regardless of change in the voltage of the source of electrical power.

3. In a radio receiver circuit, a source of frequency modulated waves, high frequency amplifying and mixing means for amplifying said frequency modulated waves, connected to said source, local oscillator means connected to said high frequency amplifying and mixing means to create a resultant beat frequency of lower value, said local oscillator means having a tunable tank circuit to determine its frequency of oscillation, a discriminator-detector section connected to said high frequency amplifying and mixing means to convert the frequency modulations into voltage variations, a reference diode, a source of electrical power of variable voltage, a first and a second voltage divider means connected to the source of electrical power and to ground and having intermediate reference points in each at which desired voltages are developed, said intermediate reference point in said first voltage divider means being connected to the output of the discriminator-detector section and said reference diode being connected across said reference points of the first and second voltage divider means and to the tunable tank circuit of the oscillator to regulate the voltage across the diode and maintain the frequency of the oscillator constant regardless of change in the voltage of the source of electrical power, said first voltage divider means including a varistor in one portion thereof so that the voltage at the intermediate reference point thereof varies at a different rate than that of the source of electrical power.

References Cited by the Examiner

UNITED STATES PATENTS

| | | | |
|---|---|---|---|
| 2,432,033 | 12/47 | Nicholson | 325—492 |
| 2,811,647 | 10/57 | Nilssen | 331—175 |
| 2,834,885 | 5/58 | Shute | 331—175 |
| 2,903,585 | 9/59 | Thanos | 329—189 |
| 2,906,926 | 9/59 | Bauer | 317—148.5 |
| 2,959,644 | 11/60 | Grace | 325—310 |
| 3,065,424 | 11/62 | Whisenhunt | 325—492 |

OTHER REFERENCES

Kidd: "RCA Technical Notes No. 311," November 1959 (1 page).

DAVID G. REDINBAUGH, *Primary Examiner.*

SAMUEL B. PRITCHARD, *Examiner.*